(12) United States Patent
Thompson et al.

(10) Patent No.: US 11,444,751 B2
(45) Date of Patent: Sep. 13, 2022

(54) SYSTEM AND METHOD FOR SENDING AND/OR RECEIVING ENTROPY AND ENTROPY EXPANSION

(71) Applicant: Introspective Power, Inc., Broomfield, CO (US)

(72) Inventors: Anthony Scott Thompson, Broomfield, CO (US); Steven Paul Cummings, Broomfield, CO (US)

(73) Assignee: Introspective Power, Inc., Broomfield, CO (US)

( * ) Notice: Subject to any disclaimer, the term of this patent is extended or adjusted under 35 U.S.C. 154(b) by 92 days.

(21) Appl. No.: 16/704,672

(22) Filed: Dec. 5, 2019

(65) Prior Publication Data

US 2020/0186331 A1 Jun. 11, 2020

Related U.S. Application Data

(60) Provisional application No. 62/923,994, filed on Oct. 21, 2019, provisional application No. 62/775,761, filed on Dec. 5, 2018.

(51) Int. Cl.
*H04L 9/06* (2006.01)

(52) U.S. Cl.
CPC .................. *H04L 9/0656* (2013.01)

(58) Field of Classification Search
CPC .................................................. H04L 9/0656
See application file for complete search history.

(56) References Cited

U.S. PATENT DOCUMENTS

| | | | |
|---|---|---|---|
| 7,093,126 B1 * | 8/2006 | Jutla ..................... | H04L 9/0637 713/168 |
| 8,108,678 B1 * | 1/2012 | Boyen ................... | H04L 9/0847 713/176 |

(Continued)

OTHER PUBLICATIONS

Barker et al., "Recommendation for Random Number Generation Using Deterministic Random Bit Generators", National Institute of Standards and Technology, Special Publication 800-90A, Revision 1, Jun. 2015, 110 pages.
Federal Information Processing Standards Publication 197, Nov. 26, 2001, 51 pages.
Garcia-Escartin, "Quantum Random Number Generators", Reviews of Modern Physics 89, 015004, 2016, 55 pages.

(Continued)

*Primary Examiner* — Meng Li
(74) *Attorney, Agent, or Firm* — Nixon & Vanderhye P.C.

(57) ABSTRACT

A message is embedded within an entropy stream. The message is encrypted using a onetime pad (OTP) and thus looks like part of the entropy string since the OTP encrypted messages is, as long as the "pad" material and message content are known, itself random to the observer. The encrypted message contains information used to identify and/or point to relevant information in another part of the entropy stream. For example, the OTP-encrypted message may indicate the number of units of the message, and point to a position in another part of the stream where another message is located. The stream may be randomly and deterministically expanded. Other techniques encrypt a stream using standard encryption, the stream comprising messages that are deterministically OTP encrypted; expand said encryption using a byte vector/array of randomness including at least one random vector; periodically swap out at least one member from the vector; hide vector random bytes in messages and/or using the messages to direct which bytes to remove from the stream of randomness/entropy; and store a stash of randomness separately from the messages and/or pull off the random/entropy stream as directed by the messages. By using true random and determinism, we create (Continued)

a method of generate a known pool of randomness that, if intercepted, cannot be discovered through mathematical analysis.

16 Claims, 8 Drawing Sheets

(56) References Cited

U.S. PATENT DOCUMENTS

| | | |
|---|---|---|
| 8,995,652 B1 | 3/2015 | Thompson |
| 9,584,313 B2 | 2/2017 | Thompson |
| 2014/0016776 A1* | 1/2014 | Van Foreest .......... H04L 9/0869 380/46 |
| 2017/0034167 A1* | 2/2017 | Figueira .............. H04L 63/0428 |
| 2020/0328886 A1* | 10/2020 | Newton ................ H04L 9/0869 |

OTHER PUBLICATIONS

Heninger et al. "Mining Your Ps and Qs: Detection of Widespread Weak Keys in Network Devices", Proc. 21st USENIX Security Symp. (Security 12), 2012, 6 pages.

Rukhin et al., "A Statistical Test Suite for Random and Pseudorandom Number Generators for Cryptographic Applications", National Institute of Standards and Technology, Special Publication 800-22, Revision 1a, Apr. 2010, 131 pages.

Vassilev et al, "The Importance of Entropy to Information Security", Security, 2014, pp. 78-81, vol. 47, No. 2, IEEE Computer Society, four pages.

Vassilev et al., "Entropy as a Service: Unlocking Cryptography's Full Potential", Sep. 2016, pp. 98-102, vol. 49, No. 9, IEEE, eight pages.

* cited by examiner

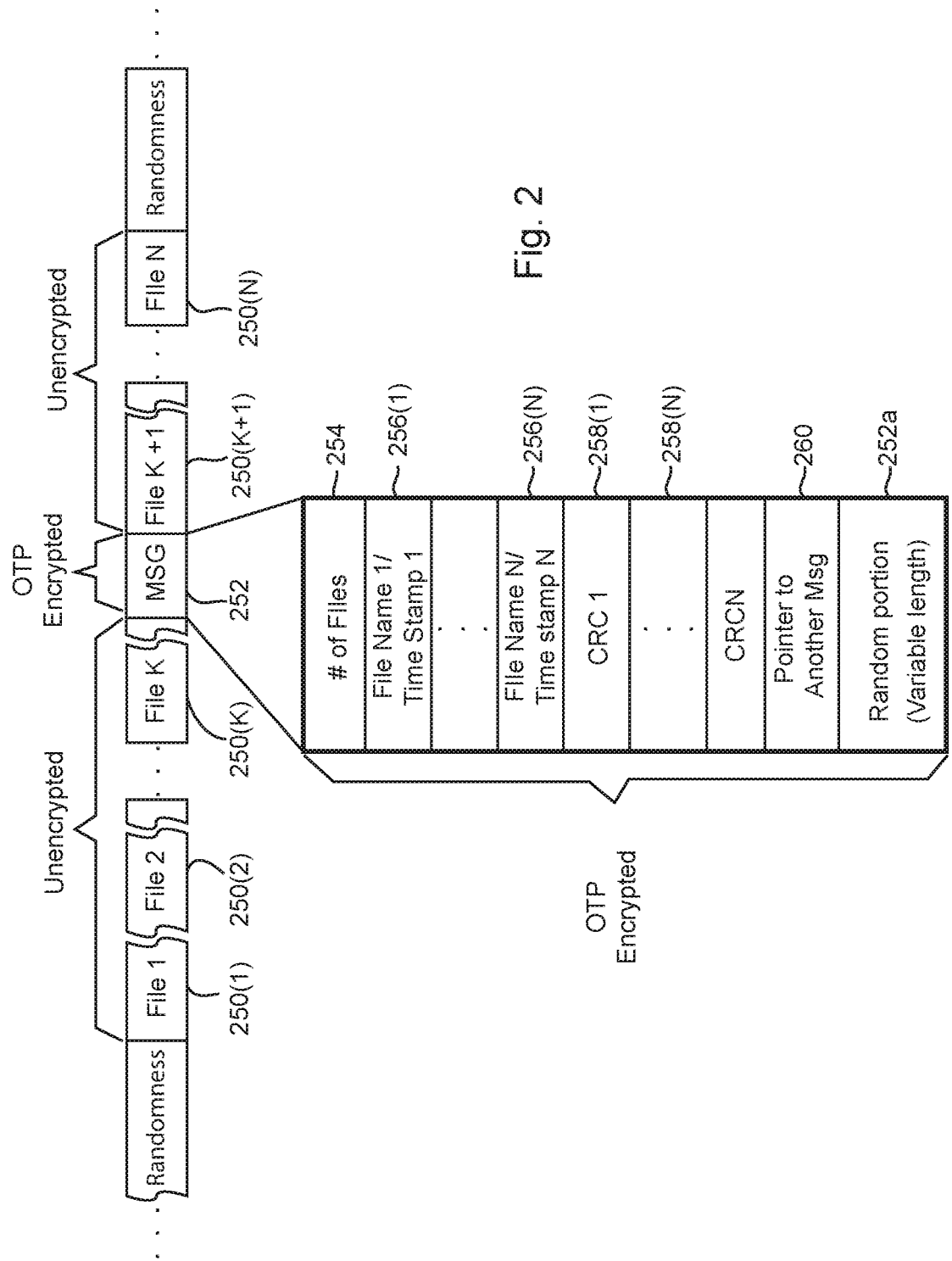

SYSTEM AND METHOD FOR SENDING AND/OR RECEIVING ENTROPY AND ENTROPY EXPANSION

CROSS-REFERENCE TO RELATED APPLICATIONS

This application claims priority from U.S. provisional patent application No. 62/923,994, filed on Oct. 21, 2019, and U.S. provisional patent application No. 62/775,761 filed Dec. 5, 2018, each incorporated by reference as if expressly set forth.

STATEMENT REGARDING FEDERALLY SPONSORED RESEARCH OR DEVELOPMENT

None.

FIELD

Example non-limiting technology herein relates to providing entropy to a computing device for use in encrypting/decrypting and/or performing other processes. Still more particularly, the technology relates to transmitting entropy over a secure and/or insecure communications link or channel in a way that prevents attackers/eavesdroppers from learning how to use the entropy. The technology also relates to secure techniques for expanding entropy to increase security and conserve network bandwidth.

BACKGROUND

Entropy refers to the disorder or randomness in the universe. In the realm of technology, entropy is not undesirable. To the contrary, in some forms of computing, entropy is used as a source of purely random data for processes that require or benefit from randomness. Such processes may include art, gambling, science, cryptography, and others. As an example, cryptographic functions become more secure if the information used to generate them is highly unpredictable and therefore less likely to be learned or predicted by an attacker. Rather than simply guessing a password that might include a birthdate or the name of a pet, an attacker must somehow generate a purely random string that is not predictable from any other information he has or can obtain.

In the past, truly random numbers were hard to generate. Nowadays, it is possible to purchase hardware-based, true random or pseudorandom number generators (TRNGs or PRNG's respectively) that generate lengthy strings of random/pseudorandom data that don't conform to any discernible pattern. Such TRNG's work based on some kind of natural phenomena that generates random noise (e.g., earth tremors, temperature fluctuations, electrical discharge, deactivation light intensity of a semiconductor light emitting diode, etc.) or more recently, quantum physics. See e.g., Garcia-Escartin, "Quantum Random Number Generators" Reviews of Modern Physics 89, 015004 (2017).

The truly random data such number generators produce can be evaluated based upon its "entropy:—a measure of the unpredictability of information content. See, e.g., "A Statistical Test Suite for Random and Pseudorandom Number Generators for Cryptographic Applications", SP800-22REV.1a, NIST Information Technology Laboratory (April 2010).

A potential problem to be solved relates to secure transmission of random information over a communication channel. As one particular example, the outputs of random and pseudorandom number generators are often used for the generation of cryptographic key material. Such cryptographic key material is typically needed as a shared secret on both sides of an encryption/decryption process. In particular, a transmitter of secure information uses the random data to encrypt a message, and a receiver for decrypting the information needs the same random data (or at least a derivative of it such as in Public Key cryptography) to decrypt the message. It can be a challenge to communicate the random information from one side to the other (or to both sides in the case of random information generated elsewhere without the random information being intercepted and used to defeat the security of the encryption/decryption process.

As an example, suppose Mary, Queen of Scots wishes to send secret letters to her nobleman friend Anthony Babington. She could use a simple transposition cypher in which each letter of the alphabet is mapped into a symbol, and in which some commonly used words are also mapped directly into different symbols. She could share the list of transpositions with Mr. Babington when he personally comes to visit her in prison. Unfortunately for Mary, such simple cyphers can be broken through a technique known as "frequency analysis." Basically, the characteristics of the written language (and in particular, the fact that certain letters such as vowels appear more often than certain other Letters) can be used to make educated guesses concerning what the encrypted message must be. If many of Mary's letters are intercepted by the government codebreakers, they will use frequency analysis to eventually figure out the cipher she has been using to communicate with Mr. Babington. The result could be disastrous for Mary—for example, public execution.

Now suppose Mary had be able to use a truly random transposition. By mapping each secret letter against random data and using new random data for each letter she encrypts, the government codebreakers could not have guessed through frequency analysis or otherwise what her cipher was, and the content of her letters would remain unknown even if the letters themselves were intercepted by the government. However, to make this kind of system useful, Mr. Babington would also need to have access to the same random transposition. If Mr. Babington were unable to visit Mary in prison, Mary would need to smuggle the random transposition for each letter out of prison and have it delivered to Mr. Babington. Unfortunately for Mary, since the government had no trouble intercepting her letters, it could also intercept any lists of random numbers she tried to smuggle out of prison.

Modern electronic communications allows us to send data very rapidly across great distances. Such transmission mechanisms over the Internet or otherwise are typically less secure than Mary's letters smuggled in empty ale casks. In fact, modern computer security analysts usually must assume that any information transmitted between two parties over a public network will be intercepted and used by an attacker for whatever he or she may glean from it. While is possible to encrypt secret key information that is used to encrypt the message, this doesn't necessary solve the problem because it still requires key or other random information to be securely shared. Sometimes, people use different communications channels (e.g., mail or hand delivery) to exchange secret key information. Such exchange techniques are troublesome and costly and may not be successful since, as Mary learned to her horror, any form of message conveyance (even secret letters smuggled out in ale casks by supposedly trusted aids) can be intercepted if the stakes are high enough.

There are applications beyond encryption and secure messaging for securely sending randomness and/or entropy. For example, widely varying purposes including but not limited to science, art, statistics, cryptography, gaming, gambling, and other fields all benefit from the use of randomness and entropy. Many such applications including computer security and beyond could benefit from secure communication and maintenance of such randomness and entropy. See e.g., E. Barker and J. Kelsey, Recommendation for Random Number Generation Using Deterministic Random Bit Generators, NIST Special Publication 800-90A, rev. 1, Nat'l Inst. of Standards and Technology, June 2015; http://nvlpubs.nist.gov/nistpubs/SpecialPublication/NIST.SP.800-90Arl.pdf; N. Heninger et al., "Mining Your Ps Qs: Detection of Widespread Weak keys in Network Devices," Proc. 21st USENIX Security Symp. (Security 12), 2112; www.usenix.org/system/files/conference/usenixsecurity12/sec12-final228.pdf: A. Vassilev and T. Hall, "The Importance of Entropy to Information Security," Computer, vol. 47, no. 2, 2014, pp. 79-81; and Entropy as a Service: Unlocking Cryptography's Full Potential (IEEE Computer September 2016, pp. 98-102, vol. 49).

Thus, while much work has been done in the past, further improvements are possible and desirable.

BRIEF DESCRIPTION OF THE DRAWINGS

Features and advantages of example non-limiting implementations may be understood from the following detailed description of example non-limiting embodiments, in conjunction with the drawings of which:

FIG. 2 shows an example non-limiting entropy stream format.

DETAILED DESCRIPTION OF NON-LIMITING EMBODIMENTS

Figure 1:
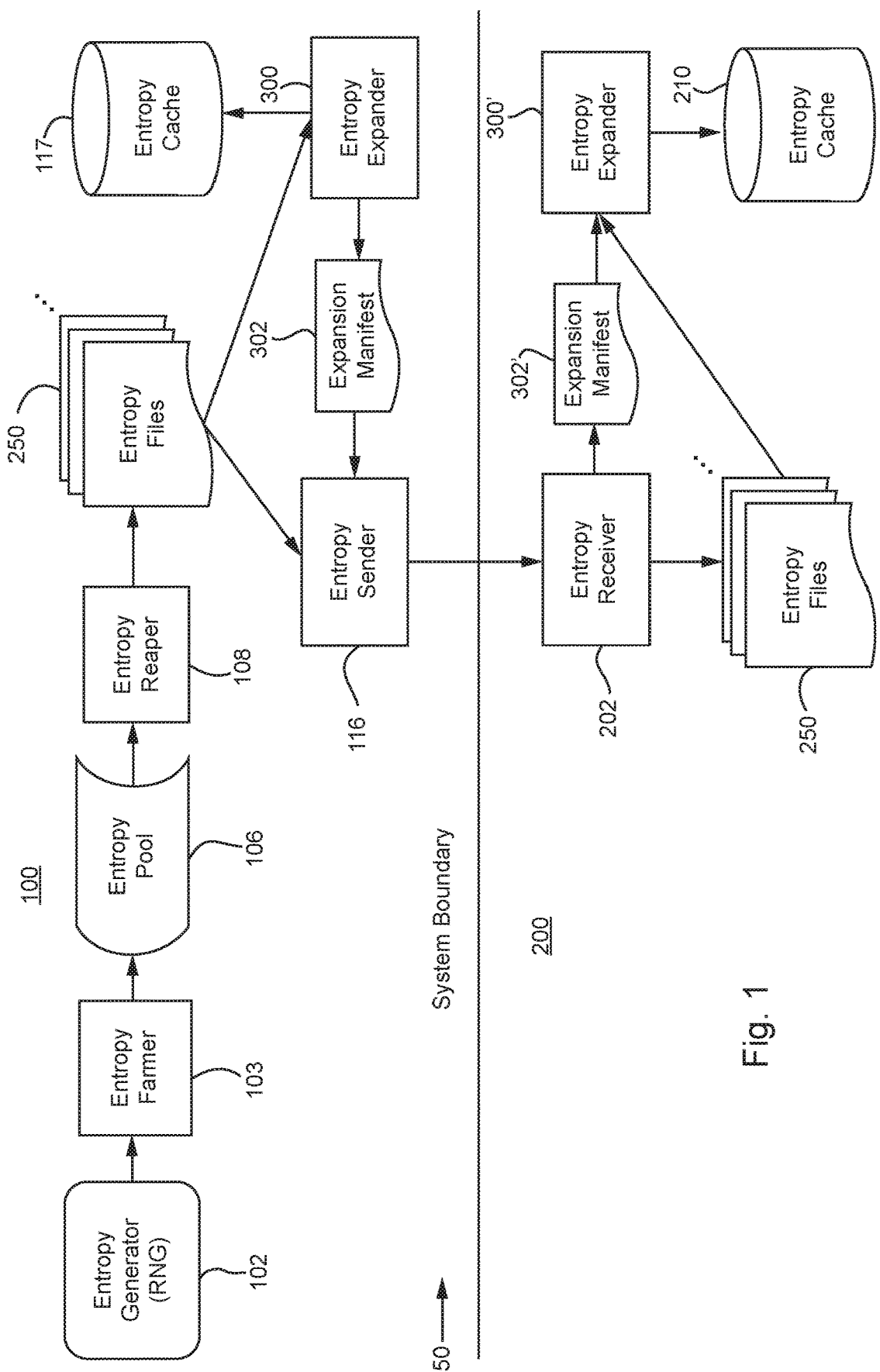
FIG. 1 shows an example non-limiting random information sharing system.

Non-limiting features and advantages of example non-limiting embodiments include:
- A stream that in some embodiments can use standard encryption
- Messages (deterministic) are OTP encrypted in the stream
- Both sides expand the encryption using byte vectors/arrays of randomness
- There is one or plural (e.g., two) random vectors
- Plural N (where N may be a random number) vectors provides better obfuscation (it may simply be a second pass)
- a N number vectors have members periodically swapped out.
- Vector random bytes are hidden in messages; or in other embodiments, the messages direct which bytes may be swapped out from the stream of randomness/entropy.
- In some embodiments, a small stash of randomness is stored separately and comes in the messages and/or is pulled off the random/entropy stream as directed by the messages. This has a separate expansion vector process.
- Such a separate stash could also come from the expanded entropy as directed by the messaging.
- Vectors can start at different points per expansion as directed.
- Vectors can also be scrambled as directed per pass.

In one example non-limiting implementations, random information is transmitted in unencrypted form over a communications channel. In most practical systems, the designers of the system will assume that an attacker will have access to and can eavesdrop upon the random stream transmission.

In example non-limiting embodiments, a message is embedded within the stream. The messages encrypted using a random one time pad (OTP) look like part of the random string since the OTP is itself random. The encrypted message contains information used to identify and/or point to relevant information in another part of the random stream. For example, the OTP-encrypted message may indicate the number of units of the message, and point to a position in another part of the stream where another message is located.

In some example embodiments, the message is also a random string, i.e., a sequence of random values generated by a random number generator. Using a random One Time Pad to transpose or encrypt a sequence of random values results in a random string that cannot be attacked through frequency analysis or any other known cryptanalysis it is perfectly secure. In some embodiments, the resulting random string is further encrypted using conventional encryption (e.g., AES 256 or any other symmetrical or asymmetrical encryption) before transmission. If desired, further precautions such as cryptographic key rotation, port rotation, and/or transmission of decoy stream, may be used to further increase security and make the random string inaccessible to an attacker. However, even if the attacker could defeat such additional security to obtain the transmitted random string, the attacker would still not be able to learn the underlying random string message because it has been encrypted using a perfectly secure One Time Pad.

In some non-limiting embodiments, the amount of transmitted random (entropy) data actually used to enable cryptographic processes can be reduced or minimized, and each (or multiple) ends of a cryptographic process can used shared secrets to expand the entropy data as needed. The shared secrets can be transmitted in additional expansion-instruction messages embedded within the stream that provide vectors for entropy expansion. These expansion-instruction messages can be entrypted using one time pads that comprise parts of the entropy stream or the expanded entropy stream. In some embodiments, the expansion-instruction messages can be shared at times that are different from when the entropy data is transmitted, using different communications channels. In some embodiments, the expansion-instruction messages could be shared in a highly secure way such as by courier or personal meeting. For example, they could be stored in tamper-resistant dongles or other memory devices that are provided in physical form.

When an attacker intercepts a random stream transmitted over the Internet or other insecure communications channel, he or she will not be able to distinguish the encrypted message from any other part of the stream. Because the message (which may itself be entropy) is encrypted using a onetime pad, it is perfectly secure. Only if one knows where the message is embedded and the length and format of the message as well as the random information used to encrypt the message using the one time pad (which, in a correct implementation is not accessible), is it possible to decrypt the message in order to learn its contents. In some cases, message contents indicate the other parts of the stream that contain particular random data used to encrypt messages to be communicated, expansion vector information (instructions used to expand the entropy stream), as well as other housekeeping information such as check sums and time stamps. In short, this system uses determinism and randomness to remove all but the expansion pass(es). For expansion, the vector, provided in the OTP encrypted messages, and the output are known. Even if we do not encrypt the stream of randomness to be expanded, the expanded entropy is still unknown. The proof, we know the random data is 10, is: $10 \otimes Y=Z$. There is no way to discover the values of Y or Z as there is not enough information. This makes discovering the expanded randomness impossible through mathematical analysis.

In accordance with other non-limiting aspects, the entropy transmission system can "farm" the output of the entropy generator in order to harvest random data for use. In such example non-limiting implementations, the system may direct the output of an entropy generator to a buffer in a memory device. The system may harvest selected portions of the buffer, deduplicate them to avoid possible duplicative information (although this will generally not be necessary if the entropy is truly random), and transmit the deduplicated information over a communications channel. The harvesting and deduplication processes are preferably performed in such a way that does not decrease the amount of entropy in the information being sent.

Example Entropy Farming System

FIG. 1 shows an example non-limiting entropy transmission system 50 including an entropy transmitter 100 and an entropy receiver 200. Within entropy transmitter 100, an entropy generator (random or pseudorandom number generator) 102 generates a stream of random or pseudorandom data values. This stream is "farmed" by an entropy farmer 103 and stored in an entropy pool 106. The entropy pool 106 is harvested or reaped by an entropy reaper 108 and formatted into entropy files 250. The files 250 are provided to an entropy sender (transmitter) 116 for transmission/communication to an entropy receiver 202.

The entropy receiver 202 recovers the entropy files 250' and stores the received entropy files in an entropy cache 210 for use in any application where entropy is useful.

Figure 1A:
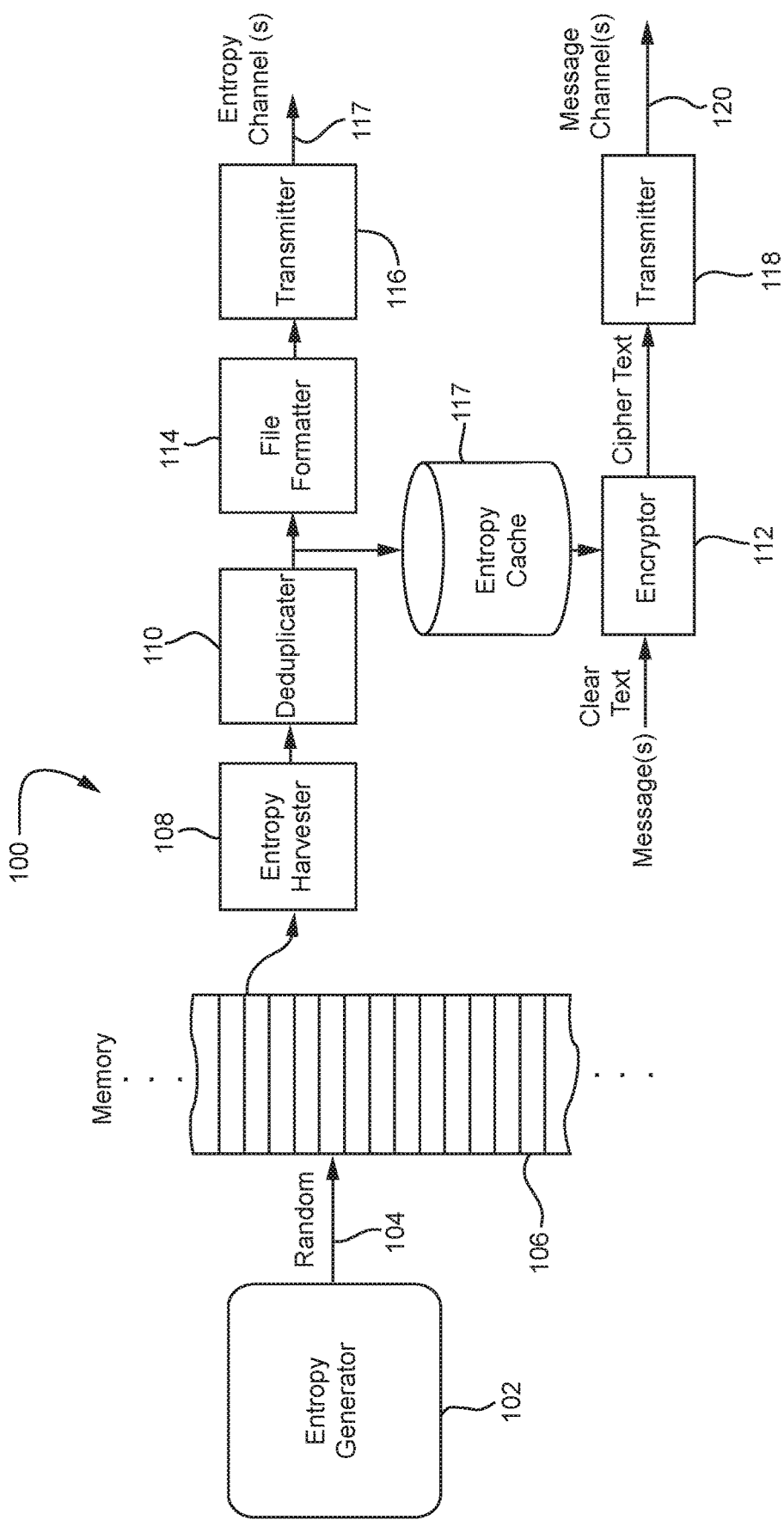
FIG. 1A shows an example entropy sending system.

FIG. 1A shows an example entropy generator and transmission system 100 in the particular context of an encrypted message transmission system. System 100 includes entropy generator 102 that generates random or pseudorandom data with a high degree of entropy, i.e., unpredictability. Such generator 102 can operate on known principles based on for example electrical discharge, temperature fluctuations, quantum physics, etc. The entropy generator output 104 is "farmed" by being selectively written into a memory 106 such as a magnetic disk drive, a semiconductor memory or any other storage device to provide an entropy pool. An entropy "harvester" or "reaper" 108 reads random or pseudorandom data from memory (entropy pool) 106, just as a combine harvests crops from a farmer's field, breaking the data up into files or blocks. The entropy data can be "conditioned" such as (but not limited to) deduplicated by a deduplicator 110 as part of this process to eliminate redundancy (if necessary) to provide a random stream of values use such as by encryption performed by encryptor 112. Deduping may also be performed right before expansion. This further hides OTP encrypted messages embedded in the data stream that will likely contain some duplicates. This further masks the messages in the steam of random information. To that point, conditioning/deduplicating can be perforated in any order. A file formatter 114 formats the deduplicated random values into files (which may be of variable length). In some embodiments, files are not deduplicated until they reach the receiver and/or are expanded at the receiver (see below).

The system 100 also inserts, preferably at some random position within the random file stream, an embedded message encrypted using a One Time Pad (OTP).

A transmitter 116 transmits the file stream with embedded message(s) over one or more entropy channel(s). See e.g., U.S. Pat. Nos. 8,995,652 and 9,584,313. Port facading and other moving target defense strategies may be used to make it more difficult for an attacker to intercept any useful portion of the transmitted stream. The same or different transmitter 118 may be used to transmit, over the same or different channels, ciphertexts of messages the encryptor 112 encrypts.

FIG. 2 shows an example output stream that the FIG. 1A transmit system 100 generators. The output stream comprises a plurality of sequentially transmitted files 250 embedded in which is an OTP encrypted message 252. Message 252 may comprise a number of fields including for example:

number of files 254
    file names 1-N (256(1)-256(N)) corresponding to N files 254
    cyclic redundancy check (CRC) values 258—one for each file
    pointer 260 to the position of another message in the same or different file stream.
    a random variable length pad 252a.

In the embodiment shown in FIG. 2, the overall transmission stream is not encrypted but the embedded message portion is encrypted. In other example embodiments, some or all of the rest of the transmission stream is also encrypted using conventional encryption such as AES, DES, Public Key, block cipher chain or any other conventional form of encryption.

Figure 2A:
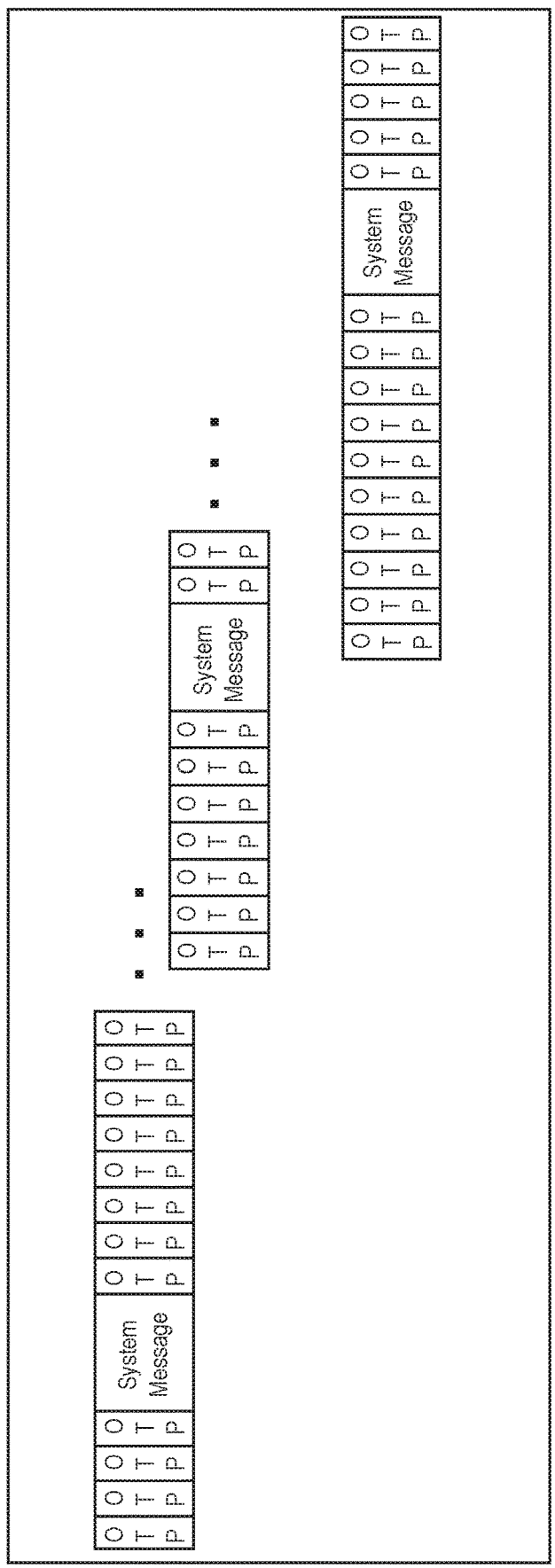
FIG. 2A shows an example non-limiting embedded system message.

FIG. 2A shows another example non-limiting embedded system message. In example embodiments, system messages are put at different spats in the OTP stream and are variable in length. The number of OTPs being sent is also variable to ensure the streams cannot be easily identified. The System Messages are OTP encrypted to ensure they cannot be decrypted by an attacker. They contain deterministic information around port rotation, expansion and other important information required to keep the two sides of the OTP transfer in synchronization.

The number of files 254 may be variable and may change randomly with each transmission. Thus, the number of files needed to cover a particular cache is a moving target that an attacker will not be able to predict beforehand.

The pointer 260 in some examples could point to the position of the next message 252 in the same file stream. In other implementations, the file stream could be transmitted in any order, and message 252 could point to a previously transmitted part of the file stream as opposed to a part of the file stream that already has been transmitted. The system 50 preferably locates the initially transmitted message via some convention that is not known to or discoverable by an attacker, and that can itself be randomized.

The message 252 is padded with a random length data string 252a of random content. Additional random content may be included in other parts of the stream in some embodiments such as before and/or after the file stream (or in some cases, in between files).

Figure 1B:
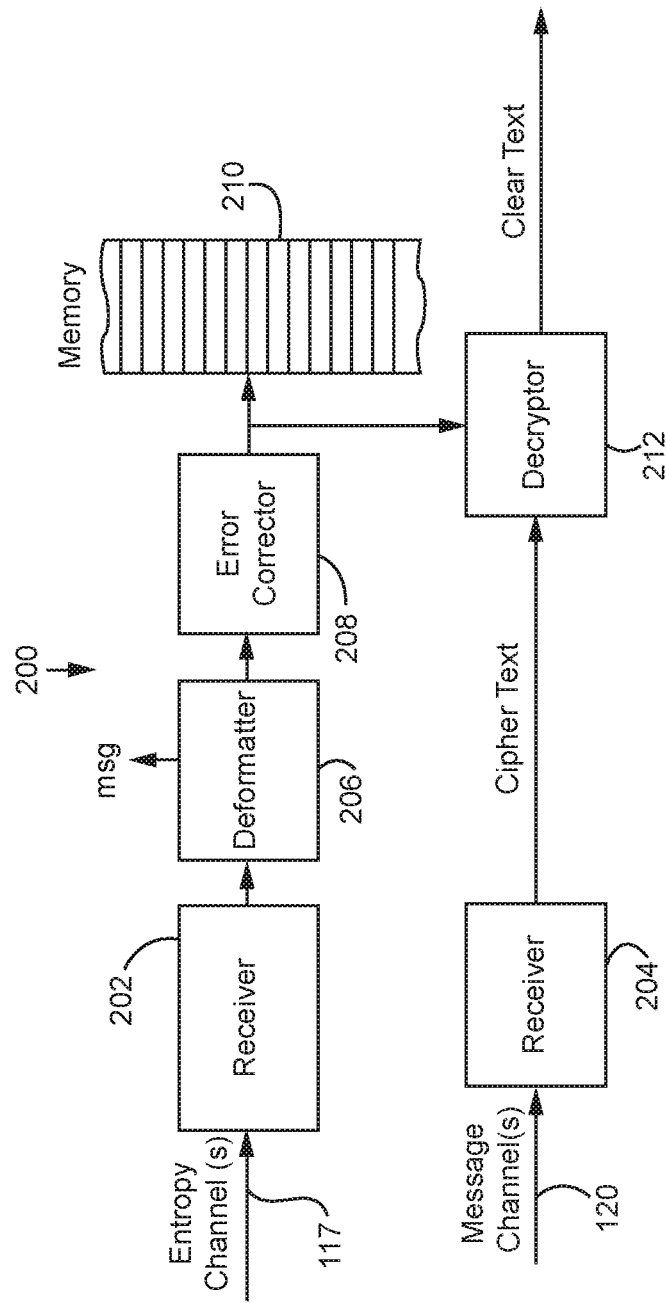
FIG. 1B shows an example entropy receiving system.

FIG. 1B shows an example non-limiting receiving system 200. Receiving system 200 includes a receiver 204 that receives information transmitter 118 transmits over message channels) 120, and the same or different receiver 202 that receives information transmitter 116 transits over entropy channel(s) 117. Receiver 202 provides the received random stream to a deformatter 206 that deformats the transmitted information to recover the original stream and also recovers the embedded formatting message (which is recovered using OTP decryption). In the example shown, the deformatter 206 uses information in the recovered message to resolve the received stream into file structures matching (or at least bearing a predetermined relationship with) the corresponding file structures at transmitter 100. An error corrector 208 uses forward error correction information from the recovered embedded information to correct errors in the received stream. The output of error corrector 208 may be provided to buffer in a memory (pool) 210, and may also be provided to a decryptor that decrypts the ciphertext received by receiver 204 to provide clear text.

While transmitter 100 includes an encryptor 112 and transmitter and receiver 200 includes a receiver 204 and decryptor 212 to convey encrypted messages securely, other embodiments (such as shown in FIG. 1) need not include such components and may instead use the system primarily or exclusively to convey entropy from transmitting system 100 to receiving system 200. Alternatively, systems 100, 200 could include additional components in addition to those shown that use the communicated entropy for any purpose including but not limited to science, art, statistics, cryptography, gaming, gambling, and other fields.

The examples shown in FIGS. 1A, 1B can be implemented in any desired structure including hardware, software or a combination of hardware and software. For example, in one implementation, one or more hardware processors and/or processors executing software are used to implement the various blocks of FIGS. 1A, 1B. For example, the steps described herein can be performed by at least one processor based on instructions stored in one or more non-transitory memories that the processor executes. The channels 117, 120 can be any type of communications channels including but not limited to wired or wireless, Internet, cellular telephone, remote or local, and/or sneakernet.

Example Entropy Expansion

Figure 3:
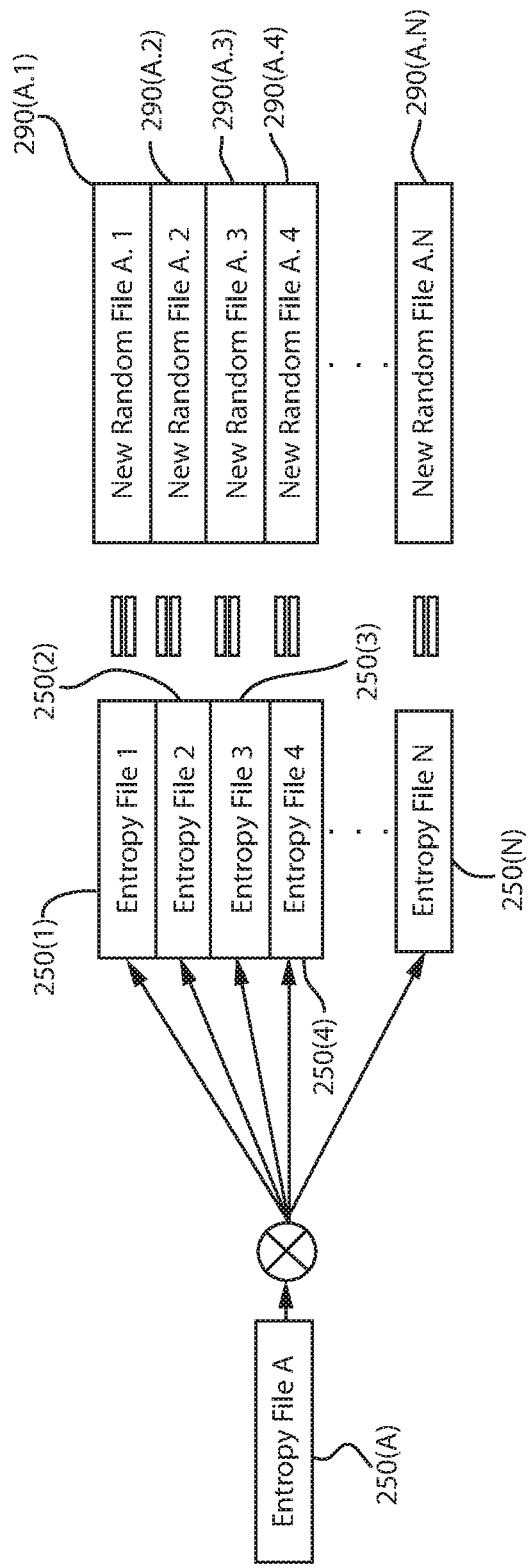
FIG. 3 shows an example entropy expansion technique.

As shown in FIG. 1, system 50 includes further an additional entropy expansion feature including entropy expanders 300 that develop additional entropy, acting as a sort of an entropy synthesis. FIG. 3 shows how an entropy file 250(A) can be expanded into any number N of entropy files 250(1), . . . , 250(N) comprising new random files 290(A.1), . . . , 290(A.N). An expansion manifest 302 (see FIG. 1) is used for the expansion function. The expansion function in one example non-limiting embodiment does not add any additional entropy, but rather provides a non-random transformation between the original entropy file and a number of additional new files 290 which are different from one another but still have the same entropy as the original entropy file. Example transformations for the expansion manifest 302 could include for example XOR, addition, multiplication, or any mathematical and/or logical transformation. One example is to XOR the file against a randomly-selected vector of files, and discarding the file immediately after a single use. The vector of files can be randomly selected after each use. Such expansion not only reduces the amount of information that needs to be exchanged, but also means that the new random files actually used by an application to provide random values are never themselves transmitted or otherwise revealed outside of the transmitter 100 and receiver 200 (each side independently derives them from other information).

If the expansion vector is randomly and deterministically changed, the overall message does not need to be encrypted before transmission and will nevertheless remain secure. Security is derived from the deterministically random expansion vector feature, which has the effect of preventing an attacker from learning the content of the underlying, untransmitted random string. Other embodiments may encrypt some or all of the message using for example standard encryption techniques.

Example Entropy Expansion System

Figure 4:
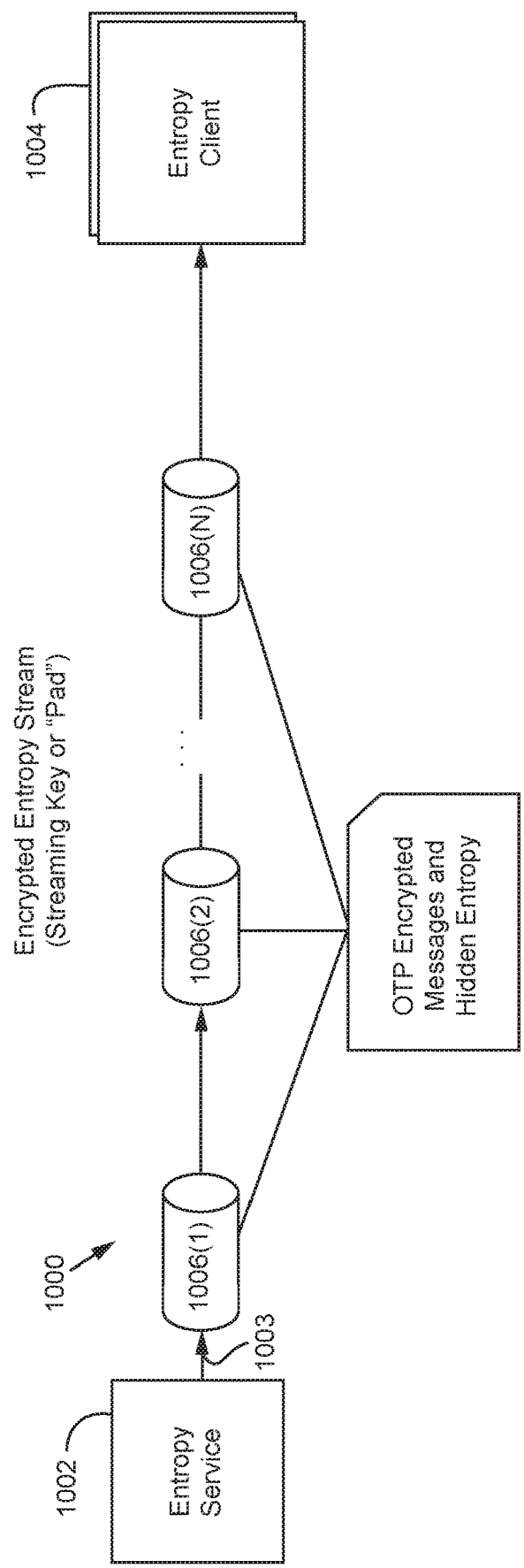
FIG. 4 shows an example non-limiting transmission of an entropy stream.
Figure 5:
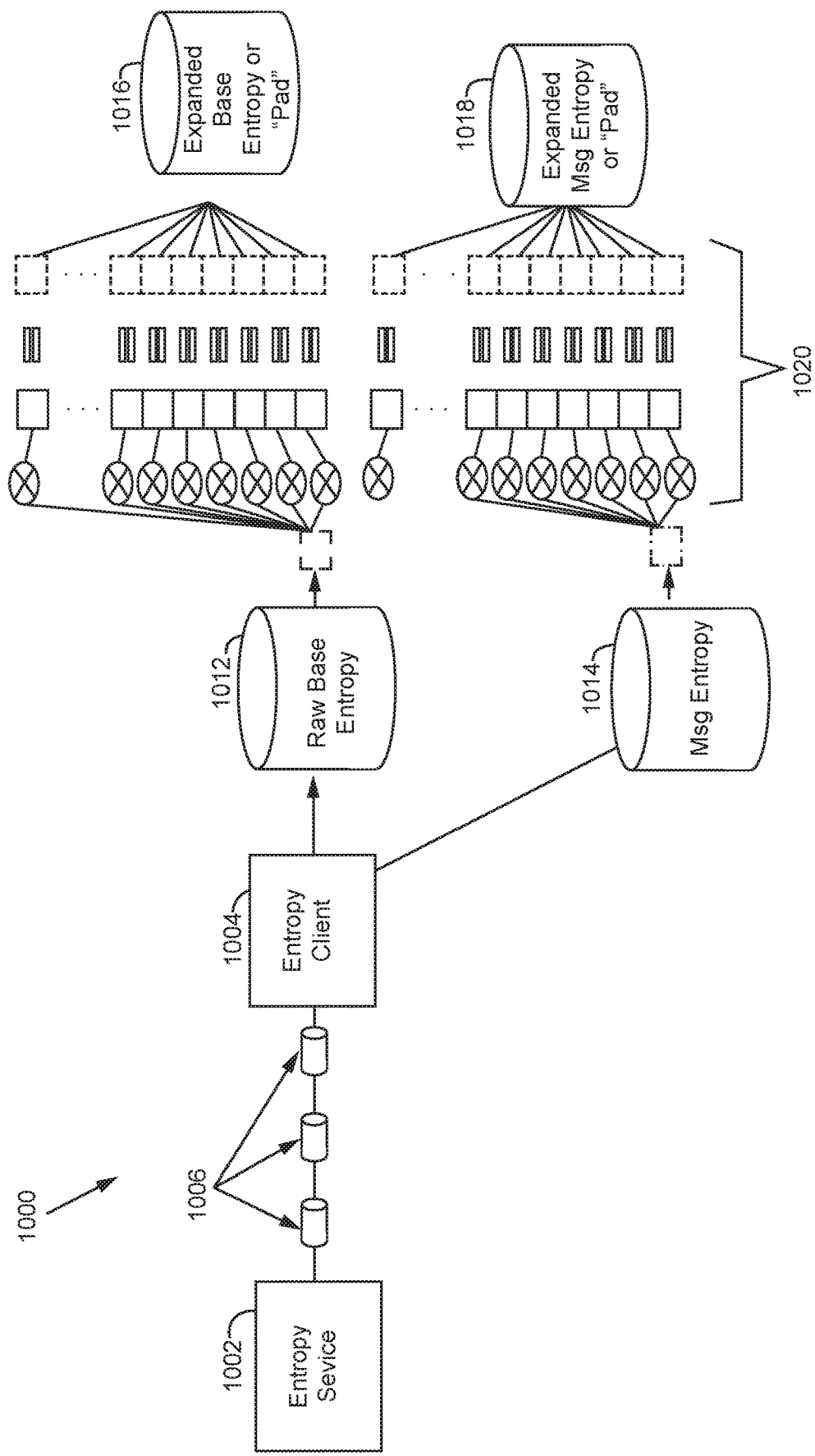
FIG. 5 shows a system that expands the transmitted entropy stream.

FIGS. 4 and 5 show a further embodiment of an entropy transmission and expansion system 1000. FIG. 4 shows an example transfer process and FIG. 5 shows a transfer and expansion process. The expansion creates an even more secure transfer as the raw entropy is not actually what is being used for encryption. As long as everything on both ends remains secure, there is no way to discover the actual "Pad" used for encryption. In this context, True Random data is being referred to as "entropy" and what we are OTP encrypting with as a pad in this expansion scenario. Once we process it, it is no longer entropy by strict definition but we can prove it is still unknown, hence true, random. When true randomness is used with determinism, we are reaching perfect security when this expanded randomness is used for OTP Encryption of data ancillary this system.

In the FIG. 4 example shown, an entropy service 1002 transmits entropy to an entropy client 1004. The entropy service 1002 generates the entropy as discussed above using an RNG, and transmits it over a potentially insecure or open channel such as the Internet. The entropy service 1002 may transmit the same entropy to multiple entropy clients 1004(1), 1004(2), . . . 1004(n) over the same or different communications channels. The entropy client(s) 1004 can use the entropy for any of a variety of applications including but not limited to cryptographic processes such as encryption and/or authentication. For example, the entropy service 1002 may send entropy to two clients 1004(1), 1004(2) which will use the (now shared) entropy to encrypt and decrypt messages the clients exchange among themselves.

In the FIG. 4 example, the entropy stream the service 1002 sends to the client(s) 1004 is encrypted. Encryption may be performed using a conventional secure encryption method such as AES 256 or any successors to such encryption standard in common use at the time you are reading this. See e.g., Federal Information Processing Standards. 26 Nov. 2001 doi:10.6028/NIST.FIPS.197.

Additional messages 1006 are embedded in the FIG. 4 stream. These additional messages 1006(1), 1006(2), . . . , 1006(n) comprise OTP encrypted messages and hidden entropy. In this non-limiting embodiment, the OTP encrypted messages 1006 include deterministic information about port rotation, key changes for the legacy (AES256) encryption, entropy rotation (vectors) for expansion and entropy to be expanded for these messages as well as other system information. The configuring of messages 1006 follows the rules of the Vernam Cipher so they are perfectly secured messages. All other information in this stream is pure entropy encrypted with any legacy encryption such as AES256. This is also perfectly secure from brute force discovery as the payload is entropy which is random and unknown.

As shown in FIG. 5, the entropy client 1004 expands the received entropy using the received entropy expansion vectors and a deterministic process. These expansion vectors are instructions or "a recipe" for expanding the received entropy using a deterministic process. Entropy expansion follows the same basic rules as the One Time Pad. The simple proof is exactly the same:

$$X+Y=Z.$$

As long as two as the variables remain unknown, there is no way to solve for the problem. In this case, we ensure this by One Time Pad encrypting both the vector information and the message information to be expanded. As long as the base entropy is true random for all parts, the result will be an even distribution of probability that will be unsolvable.

Each message 1006 in this example is OTP encrypted. It contains message (msg) entropy as well replacement entropy for the expansion vector. It also contains determistic messages around rotation. This ensures that the expansion vector, the entropy used to encrypt these messages and any command/control data is perfectly secure and remains unknown. It also ensures that no known data is sent in the raw entropy stream. Command and control information would be repeatable data that could be used to decrypt the legacy encryption protecting the raw entropy. This leaves no opportunity for brute force cracking of the legacy encryption.

As FIG. 5 shows, the raw base entropy and the message entropy are stored separately in separate storage/buffer devices 1012, 1014 and used for different purposes. In this example, the expanded message entropy or pad is used to decrypt messages 1006 (i.e., as overhead to support system 1000), and the expanded base entropy or pad is used by the entropy client 1004 for the any desired application as discussed above including but not limited to one time pad encryption of messages to be exchanged with one or multiple parties.

A processor, circuit, or other computing device expands each stored entropy by performing an expansion process 1020 using the techniques described above based on the received expansion vectors. The expansion process 1020 for the raw base entropy can but need not be the same as the expansion process for the message entropy. In the example show, the expansion process is a simple XOR with additional secret random entropy data shared in messages 1006. Multiple such XOR operations with multiple streams of additional shared secret entropy data yield any desired quantity of entropy. The expanded entropy is stored in storage devices 1016, 1018 and used as an expanded base entropy or pad and an expanded message entropy or pad, respectively.

In some non-limiting embodiments, the messages 1006 provide information in the way of pointers, indices or other constructs to synchronize or line up the resulting expanded entropy for use. For example, not all of the expanded entropy needs to be used—only a subset of the expanded entropy might be used in some embodiments. Additionally, the resulting expanded entropy can be rotated or substituted as needed with other expanded entropy.

All items cited above are hereby incorporated by reference as if expressly set forth.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

The invention claimed is:

1. A method comprising at least one hardware processor performing operations comprising:
   encrypting data streams using One Time Pad (OTP) encryption, wherein the streams comprise (a) a stream of random or pseudorandom data, and (b) messages that are deterministically encrypted using a random or pseudorandom result of a random data expansion process that is utilized for One Time Pad (OTP) encryption;
   expanding said random or pseudorandom data using a byte vector/array of randomness including at least one random vector derived and removed from the stream of random or pseudorandom data, thereby creating a random or pseudorandom expansion vector where all duplicate values are removed and each byte in the stream of random or pseudorandom data is XORed against the random or pseudorandom expansion vector one at a time; and
   swapping out the at least one-random vector for a different random vector(s) for use in expanding the stream of random or pseudorandom data when one or more duplicate byte of data are detected in the random or pseudorandom data stream.

2. The method of claim 1 wherein the data expansion process is called recursively to further expand the stream of random or pseudo random data.

3. The method of claim 1 further including developing a separate cache of randomness from the expanded stream of random or pseudorandom data data as directed by the messages.

4. The method of claim 1 further including starting plural different random vectors at different points per expansion as directed by the messages.

5. The method of claim 1 further including scrambling the random vectors as directed by the messages per pass.

6. The method of claim 1 further comprising using only one random vector at a time.

7. The method of claim 1 comprising using two random vectors to improve obfuscation.

8. The method of claim 1 further comprising using N random vectors to expand said stream of random or pseudorandom data.

9. A system comprising:
   a random or pseudorandom data stream generator that generates a random or pseudorandom data stream;
   an encryptor configured to encrypt data streams using One Time Pad (OTP) encryption, wherein the streams comprise (a) the stream of random or pseudorandom data stream, and (b) messages that are deterministically encrypted using a random or pseudorandom result of a random data expansion process that is utilized for the One Time Pad (OTP) encryption; and
   at least one hardware processor configured to perform operations comprising:
      expanding said random or pseudorandom data stream using a byte vector/array of randomness including at least one random vector derived and removed from the random or pseudorandom data stream thereby creating a random or pseudorandom expansion vector where all duplicate values are removed and each byte in the random or pseudorandom data stream is XORed against the random or pseudorandom expansion vector one at a time; and swapping out the at least one random vector for a different random vector(s) for use in expanding the random or pseudorandom data stream when one or more duplicate bytes of data are detected in the random or pseudorandom data stream.

10. The system of claim 9 wherein the at least one hardware processor is further configured to call the random data expansion process recursively to further expand the random or pseudorandom data stream.

11. The system of claim 9 wherein the hardware processor is further configured to develop a separate cache of randomness from the expanded random or pseudorandom data stream as directed by the messages.

12. The system of claim 9 wherein the hardware processor is further configured to start plural different random vectors at different points per expansion as directed by the messages.

13. The system of claim 9 wherein the hardware processor is further configured to scramble the random vectors as directed by the messages per pass.

14. The system of claim 9 wherein the hardware processor is further configured to use only one random vector.

15. The system of claim 9 wherein the hardware processor is further configured to use two random vectors to improve obfuscation.

16. The system of claim 9 wherein the hardware processor is further configured to use N random vectors to expand said random or pseudorandom data stream.

* * * * *